(12) United States Patent  (10) Patent No.: US 6,236,664 B1
Erreygers  (45) Date of Patent: May 22, 2001

(54) PAIR GAIN SYSTEM WITH AN ADSL REPEATER UNIT

(75) Inventor: Jan Erreygers, Tielt-Winge (BE)

(73) Assignee: Terayon Communications Systems, Inc., Santa Clara, CA (US)

( * ) Notice: Subject to any disclaimer, the term of this patent is extended or adjusted under 35 U.S.C. 154(b) by 0 days.

(21) Appl. No.: 09/326,768

(22) Filed: Jun. 4, 1999

(51) Int. Cl.[7] .................................................. H04L 12/28
(52) U.S. Cl. ......................... 370/492; 370/352; 370/356
(58) Field of Search .................................. 370/492, 392, 370/241, 540, 535, 477, 246, 274, 501, 356, 352, 353; 375/215; 348/6; 379/90.01, 93.01, 338–379

(56) References Cited

U.S. PATENT DOCUMENTS

| 4,334,303 | * | 6/1982 | Bertin et al. ........................ 370/492 |
| 4,392,225 | * | 7/1983 | Wortman .............................. 370/492 |
| 5,534,912 | * | 7/1996 | Kostreski ............................... 348/6 |

OTHER PUBLICATIONS

Data sheet, Motorola "CopperGold Asymmetric Digital Subscriber Line (ADSL) Transceiver" type MC145650, 1997, 6 pages (referred to in this application at p. 9, line 17).
Data sheet, Raychem data sheet describing the Raychem Miniplex 2N1 UDC, May 1998, 2 pages.
European Telecommunications Standards Institute (ETSI) Specification No. TS 101 388 V1.1.1 (1998–11), "Coexistence of ADSL and ISDN–BA on the Same Pair" (1998–11) (referred to and incorporated by reference at page 7, lines 24–26, of this application).

* cited by examiner

Primary Examiner—Wellington Chin
Assistant Examiner—Prenell Jones (57) ABSTRACT

The present invention provides an efficient way to implement ADSL over long distances by combining a repeater for ADSL with a pair gain system, whereby the pair gain system remotely provides DC power to the repeater over the same pair as that for transmission of DSL and ADSL signals. The invention allows telecom operators to save huge costs in implementing ADSL over long distances, without sacrificing the quality of signal transmission. According to an embodiment of the invention, a telecommunication system comprises a central office system, a customer premise system and a repeater unit. The central office system provides and receives digital subscriber line (DSL) and asymmetrical DSL (ADSL) signals over a first pair of wires. The central office system also provides DC power to the repeater unit via the first pair. The customer premise system receives and sends DSL and ADSL signals over a second pair of wires. The repeater unit is coupled between the first and second pairs of wires for receiving an ADSL signal from the central office system via the first pair and providing a repeated ADSL signal to the customer premise system via the second pair. The repeater unit also receives an ADSL signal from the customer premise system via the second pair and provides a repeated ADSL signal to the central office system via the first pair.

20 Claims, 4 Drawing Sheets

PAIR GAIN SYSTEM WITH AN ADSL REPEATER UNIT

BACKGROUND OF THE INVENTION

The invention relates generally to telecommunication systems, and more particularly to ADSL (Asymmetrical Digital Subscriber Line) transmission systems in access network.

Telephone customers are moving in an evolutionary way to higher bandwidths, from sharing POTS (Plain Old Telephone Service) and modem on one line to dedicated analog modem line at 56 kbps (kilo-bits per second) and to ISDN BA (Basic Access). Now, ADSL has been introduced and become proven technology. ADSL refers to a high-speed transmission technology using existing twisted pair of wires that permits simultaneous POTS and high-speed data communication. Generally, a higher data rate is employed downstream than upstream. Ordinary twisted pair equipped with ADSL modems can transmit movies, television, dense graphics, and very high speed data. For all its capacity, ADSL leaves POTS undisturbed. A single ADSL line therefore offers simultaneous channels for personal computers, televisions, and telephones. With ADSL, telephone companies can connect homes and businesses to exciting new interactive broadband services.

The ADSL services are different from ISDN services. ISDN provides two 64 kbps channels for voice or data, while ADSL is predominantly a data pipe providing an asymmetrical bandwidth of up to 9 Mbps downstream and 800 kbps upstream. The customers for ADSL most likely already have a dedicated modem line or ISDN.

Figure 1:
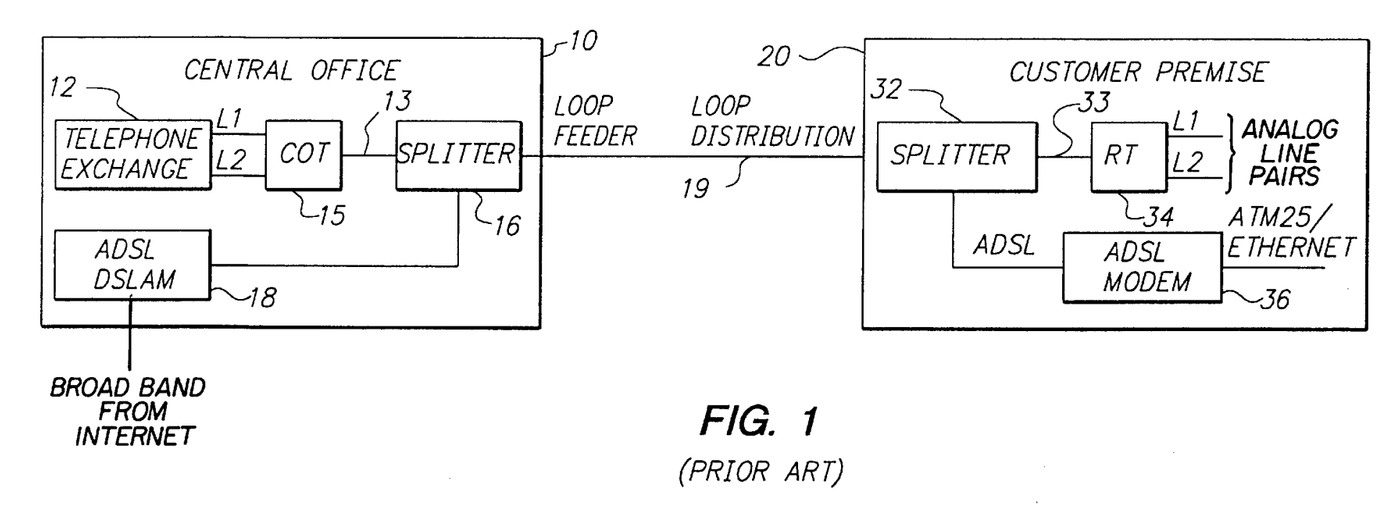
FIG. 1 shows a conventional way of implementing ADSL over a pair gain system.

FIG. 1 shows a conventional way of implementing ADSL over a pair gain system. A pair gain system is a system which typically includes a central office terminal (COT) located in a central office (CO) of a telephone company and a remote terminal (RT) located in a customer premises. The COT may have two or more line cards, each for connecting to a pair of wires from a telephone exchange in the CO. The COT of a pair gain system multiplexes signals received from the multiple pairs connected to its line cards, over a single pair connecting between the COT and the RT of the pair gain system. The COT also demultiplexes signals received from the RT via the single pair and provides them to the telephone exchange via the multiple pairs connected to its line cards. The RT demultiplexes signals received from the single pair and provides them to a subscriber at the customer premises over the same number of pairs. The RT also multiplexes signals received from the multiple pairs at the customer premises, over the single pair connecting to the COT. Thus, a pair gain system allows a subscriber at the customer premises to have two or more telephone lines without requiring the expense of installing additional pairs between the CO and the customer premises. An example of a pair gain system is the Miniplex® 2N1, which multiplexes two pairs over a single pair. Miniplex® 2N1 is commercially available from Raychem Corporation, Menlo Park, Calif.

As illustrated in FIG. 1, at a CO 10 of a telephone company, a telephone exchange 12 provides two analog POTS lines L1 and L2 in the form of two twisted pairs of wires to a COT 15 of a pair gain system. COT 15 multiplexes L1 and L2 over a single twisted pair 13 and converts the analog signals from L1 and L2 into DSL (Digital Subscriber Line) signals, such as ISDN signals, on pair 13. An ADSL DSLAM (DSL Access Multiplexer) 18 receives broadband data from the Internet, for example and provides high-speed data transmission in the form of ADSL signals. The DSL and ADSL signals provided respectively from COT 15 and ADSL DSLAM 18 are fed to splitter 16. Splitter 16 combines the DSL and ADSL signals for transmission to a customer premises 20 over a single twisted pair 19. Splitter 16 also receives the DSL signals and ADSL signals from splitter 32 and separates the DSL signal from the ADSL signal for transmission to COT 15 and ADSL DSLAM 18, respectively.

At customer premises 20, splitter 32 separates the DSL signal from the ADSL signal. The DSL signal is provided, via a pair 33, to a RT 34 of the pair gain system, which demultiplexes the DSL signal into analog signals on two analog POTS lines L1 and L2. Each of lines L1 and L2 at customer premises 20 is for connecting to a telecommunication device (not shown), such as a telephone or a fax machine. The ADSL signal is provided to an ADSL modem 36, which is connected to either ATM 25 (asynchronous transfer mode 25 Mbps) or Ethernet. RT 34 also multiplexes analog signals from analog lines L1 and L2 into a DSL signal over pair 33 for transmission to CO 10. Splitter 32 also receives DSL and ADSL signals from RT 34 and ADSL modem 36 respectively, and combines them for transmission to CO 10 over twisted pair 19. In the case of implementing ADSL over ISDN BA (basic access), an ISDN NT1 (network termination 1) can be used as RT 34.

One of the main limitations of ADSL is the loop length which is the distance between the CO or DSLAM and the customer premises. For service with a downstream speed of 5 to 6 Mbps (mega-bits per second), the loop length is limited to less than 12 kft, in order not to sacrifice the transmission quality. At the present time, telecom operators use very conservative installation rules to ensure that the service will always be properly delivered. However, they will soon receive requests for service from people living farther away from the central office where a DSLAM is located. At present, it is estimated that about 60% of the subscribers can be potentially reached and receive high-speed data services. This leaves the other 40% with only low-speed data services.

Of course, there are several solutions for delivering high bandwidth services over longer distances (e.g. fiber optics). One solution is the use of a repeater for the ADSL signal. However, ADSL repeaters face a specific issue with power feeding as the ADSL signal is usually transmitted simultaneously with POTS on a copper pair. In order that a repeater be practical in the field, it will need to receive remote power feeding. This is very difficult and may be impossible if ADSL is implemented with POTS on the same copper pair.

An easy solution is to run POTS and ADSL on different pairs. Several POTS lines can be multiplexed over one copper pair using subscriber line multiplexers. The copper pair used for ADSL can carry a DC current for remote power feeding an ADSL repeater. However in this case telecom operators must install two copper pairs in order to provide one or more POTS lines and an ADSL. Therefore, substantial additional expenses will be incurred by telecom operators for installing a second copper pair whenever ADSL service is requested to be delivered over longer distances.

Accordingly, there is a need for implementing ADSL over POTS over longer distances without requiring an additional copper pair for transmitting an ADSL signal along with a DC current to a customer premises.

SUMMARY OF THE INVENTION

The present invention provides an efficient way to transmit ADSL and multiple POTS signals over long distances by combining a repeater for ADSL with a pair gain system, whereby the pair gain system remotely provides DC power to the repeater over the same pair as that for transmission of DSL and ADSL signals.

According to one embodiment of the invention, a telecommunication system is provided. The telecommunication system comprises a first transmission/receiving system, located at a first location, that provides and receives a first type of signal in a first frequency spectrum and a second type of signal in a second frequency spectrum over a first pair of wires; a second transmission/receiving system, located at a second location, that receives and sends the first and second types of signals over a second pair of wires; and a repeater unit, coupled between the first and second pairs of wires, for receiving a second type of signal from the first transmission/receiving system via the first pair and providing a repeated second type of signal to the second transmission/receiving system via the second pair, the repeater unit also receiving a second type of signal from the second transmission/receiving system via the second pair and providing a repeated second type of signal to the first transmission/receiving system via the first pair; wherein the first transmission/receiving system provides DC power to the repeater unit via the first pair. In one example, the first type of signal is a digital subscriber line (DSL) signal and the second type of signal is an asymmetrical DSL (ADSL) signal. The first transmission/receiving system includes a central office system having a pair gain central office terminal (COT) that converts analog signals into a DSL signal. Also, the second transmission/receiving system includes a customer premises system having a pair gain remote terminal (RT) that converts a DSL signal into analog signals. Furthermore, the COT provides the DC power to the repeater unit via the first pair of wires. The repeater unit may also regenerate the DC power to a higher voltage level and provide regenerated (voltage-boosted) power to the RT over the second pair of wires.

In this embodiment of the invention, the repeater unit comprises an ADSL repeater including a power supply circuit, the ADSL repeater receiving an ADSL signal and providing a corresponding repeated ADSL signal; a first low pass filter, coupled between the first and second pairs of wires, for allowing only DSL and DC signals to pass through; a second low pass filter, coupled between the first pair of wires and the ADSL repeater, for allowing only a DC signal to pass through to the power supply circuit of the ADSL repeater; a first high pass filter, coupled between the first pair of wires and the ADSL repeater, for allowing only the ADSL signal to pass through; and a second high pass filter, coupled between the ADSL repeater and the second pair of wires, for allowing only the ADSL signal to pass through.

According to an alternative embodiment of the invention, the repeater unit comprises an ADSL repeater including a power supply and regeneration circuit that regenerates DC signals to predetermined higher voltage values, the ADSL repeater receiving an ADSL signal and providing a corresponding repeated ADSL signal; a band pass filter, coupled between the first and second pairs of wires, for allowing only a DSL signal to pass through; a first low pass filter, coupled between the first pair of wires and the ADSL repeater, for allowing only a DC signal to pass through to the power supply and regeneration circuit of the ADSL repeater; a second low pass filter coupled between the power supply and regeneration circuit of the ADSL repeater and the second pair of wires for allowing only a DC signal to pass through;
a first high pass filter, coupled between the first pair of wires and the ADSL repeater, for allowing only the ADSL signal to pass through; and a second high pass filter, coupled between the ADSL repeater and the second pair of wires, for allowing only the ADSL signal to pass through.

Accordingly, the present invention allows telecom operators to save huge costs in implementing ADSL over long distances, without sacrificing the quality of signal transmission.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE PREFERRED EMBODIMENTS

Figure 2:
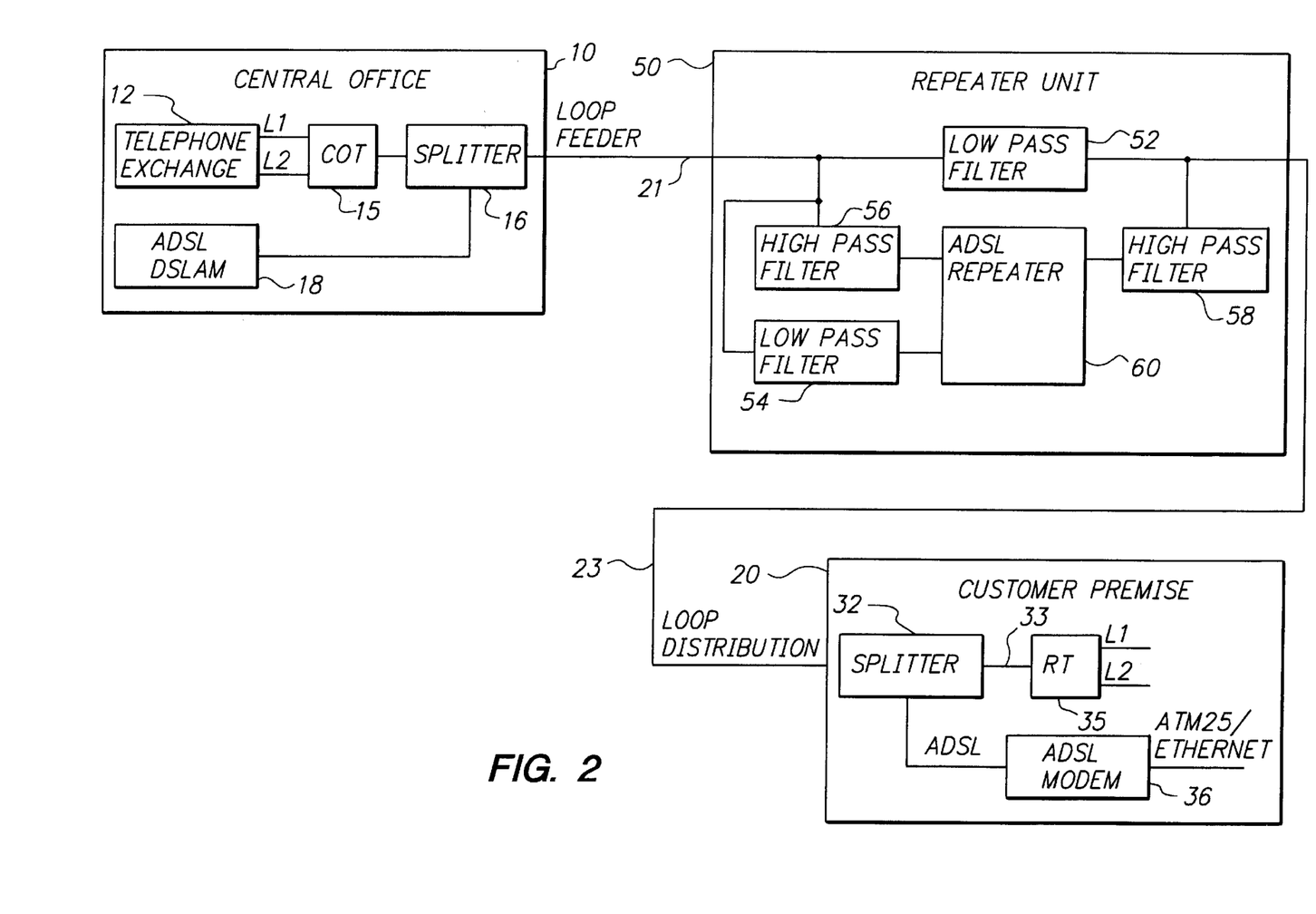
FIG. 2 illustrates a functional block diagram of one embodiment of the present invention.

FIG. 2 shows a functional block diagram of one embodiment of the present invention. In this embodiment, ADSL signals are transmitted together with basic rate ISDN (ISDN-BA) signals, which is equivalent to the technology of 2B1Q at 160 kbps, such as used by 2N1 Miniplex®, commercially available from Raychem Corporation, Menlo Park, Calif. Typically, in the this embodiment the bit rate of ADSL signal transmission is reduced by 10% compared to an embodiment in which ADSL signals are transmitted over POTS. Implementation of ADSL over ISDN-BA is described in more detail in European Telecommunications Standards Institute (ESTI) specification TS 101 388 V1.1.1 (1998-11), the disclosure of which is hereby incorporated by reference.

As illustrated in FIG. 2, a central office 10 provides ISDN and ADSL services to a customer premises 20 via a repeater unit 50, which includes low pass filters 52 and 54, high pass filters 56 and 58, and an ADSL repeater 60. Except for the pair gain system which includes a COT 15 and a RT 35, the functional blocks shown in central office 10 and customer premises 20 represent the same conventional components as those described above in connection with FIG. 1. Therefore, for simplicity the description of these components is omitted. COT 15 and RT 35 are also conventional ones, except that COT 15 uses a higher powering voltage and delivers more current and RT 35 receives a fraction of the current delivered from COT 15. The power calculations for COT 15 and RT 35 will be described later.

In ADSL repeater unit 50 shown in FIG. 2, low pass filter 52 preferably has a cutoff frequency of 100 kHz and is bi-directional. Low pass filter 52 is connected between central office 10 and customer premises 20 for filtering signals received over segments 21 and 23 of the twisted pair.

There are three signals on the twisted pair: the DC power feeding current with a frequency spectrum of 0 to 10 Hz, the pair gain DSL 2B1Q signal with a frequency spectrum of 1 to 80 kHz, and the ADSL signal with a frequency spectrum of 120 to 1000 kHz. Low pass filter 52 allows the DC current and the DSL signal to pass through, but blocks the ADSL signal. Low pass filter 52 needs to be bi-directional because the DSL signal is full duplex and the repeated downstream ADSL signal should not go back towards CO exchange 12.

Low pass filter 54 of repeater unit 50 preferably has a cutoff frequency of 100 Hz. It is connected between central office 10 and ADSL repeater 60 for filtering the signals received from segment 21 of the twisted pair and provides a high impedance for the DSL and ADSL signals. Low pass filter 54 allows only the DC current to pass through to the power supply circuit of ADSL repeater 60. This allows central office 10 to remotely provide DC power to repeater unit 50. In FIG. 2, low pass filter 54 is preferably a uni-directional filter.

High pass filter 56 of repeater unit 50 preferably has a cutoff frequency of 100 kHz and is connected between central office 10 and ADSL repeater 60. High pass filter 56 blocks the DC current and the DSL signal and allows the ADSL signal to pass through to ADSL repeater 60. High pass filter 58 of repeater unit 50 preferably has a cutoff frequency of 100 kHz and is connected between ADSL repeater 60 and customer premises 20. High pass filter 58 allows the repeated ADSL signal from ADSL repeater 60 to pass through to customer premises 20. High pass filter 58 also filters signals received from customer premises 20 and allows only the ADSL signal to pass through to ADSL repeater 60. In FIG. 2, high pass filters 56 and 58 are preferably bi-directional filters.

In FIG. 2, ADSL repeater 60 receives the downstream signal from high pass filter 56 and remodulates it for transmission towards the subscriber at customer premises 20. The subscriber at customer premises 20 would not recognize any difference from a standard ADSL over pair gain system. ADSL repeater 60 also receives the upstream signal from high pass filter 58 and remodulates it for transmission towards central office 10.

Figure 3:
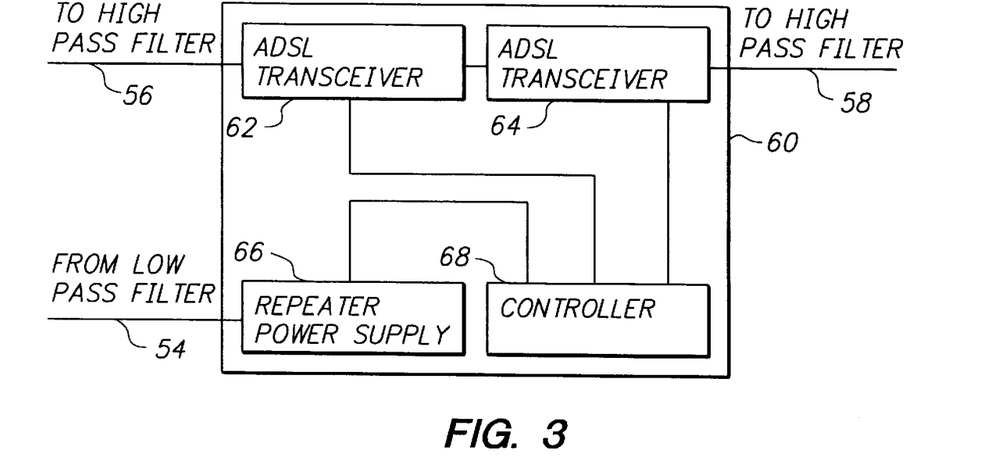
FIG. 3 illustrates a functional block diagram of an ADSL repeater of the embodiment in FIG. 2.

FIG. 3 shows a functional block diagram of ADSL repeater 60, which includes ADSL transceivers 62 and 64, a repeater power supply 66 and a controller 68. ADSL transceivers 62 and 64 are conventional devices. An example of such transceiver is CopperGold MC 145650 commercially available from Motorola, or TNETD 3000C commercially available from Texas Instruments. ADSL transceiver 62 receives ADSL signals from high pass filter 56, amplifies the received ADSL signals, and then sends the amplified ADSL signals to ADSL transceiver 64 for forwarding to high pass filter 58. Similarly, ADSL transceiver 64 receives ADSL signals from high pass filter 58, amplifies the ADSL signals, and then sends the amplified ADSL signals to ADSL transceiver 62 for forwarding to high pass filter 56. Low pass filter 54 provides DC signals to repeater power supply 66 for powering ADSL repeater 60. Controller 68 controls the operations of ADSL transceivers 62 and 64.

Figure 4:
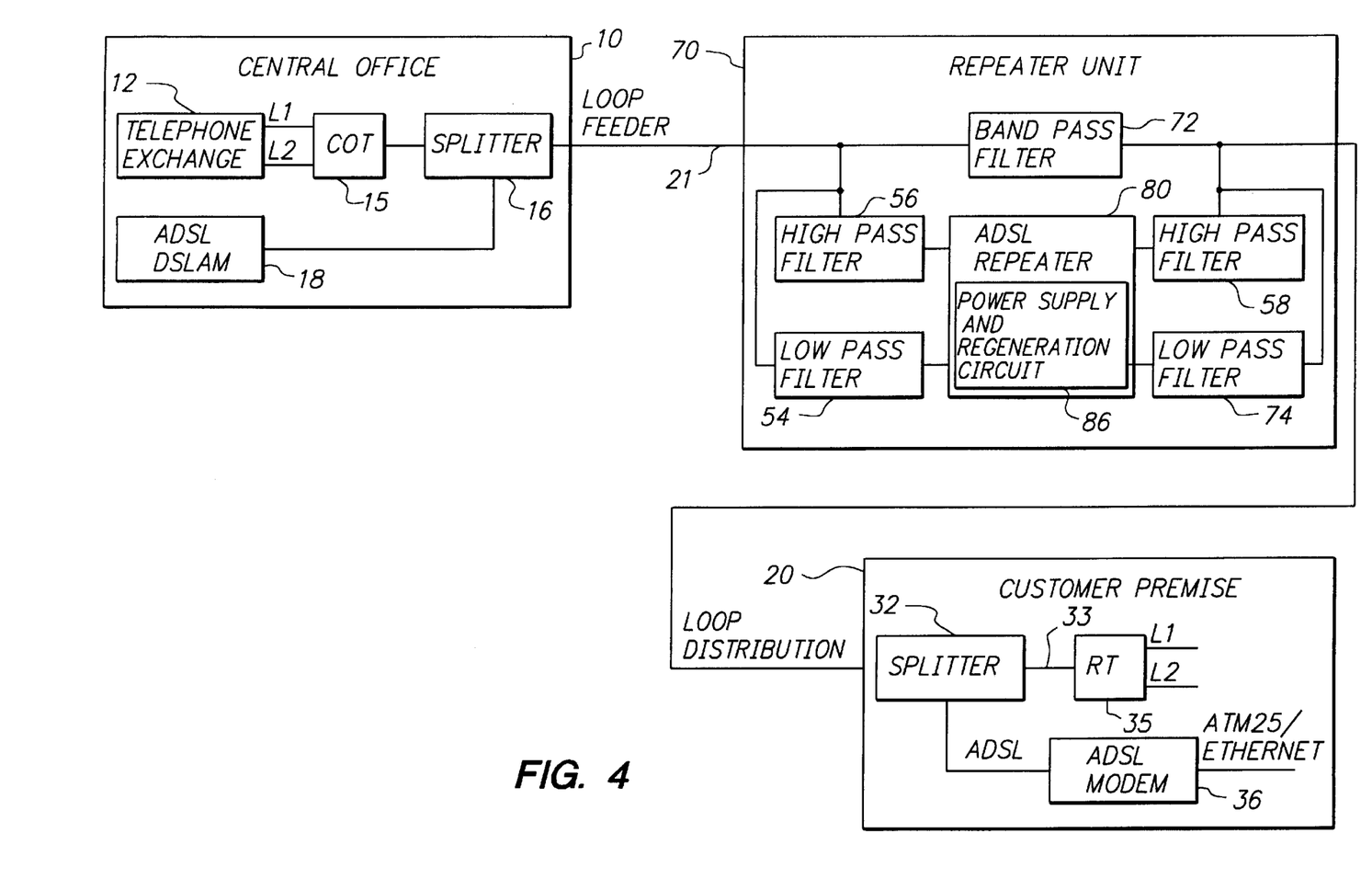
FIG. 4 shows a functional block diagram of an alternative embodiment of the present invention.

FIG. 4 shows an alternative embodiment of the present invention. For simplicity, description of the elements with the same reference symbols as those previously described is omitted. In this embodiment, the DSL signals received by repeater unit 70 pass through a bi-directional band pass filter 72 having a frequency spectrum preferably between 100 Hz and 100 kHz. Band pass filter 72 blocks the DC signals. The DC power feeding current supplied from central office 10 passes through low pass filter 54 to power ADSL repeater 80. A power supply and regeneration circuit 86 in ADSL repeater 80 will regenerate the feeding voltage to a predetermined higher value for sending, via a low pass filter 74, to customer premises to power RT 35. Like low pass filter 54, low pass filter 74 has a cutoff frequency of approximately 100 Hz. This embodiment allows signals to be transmitted over longer distances.

Figure 5:
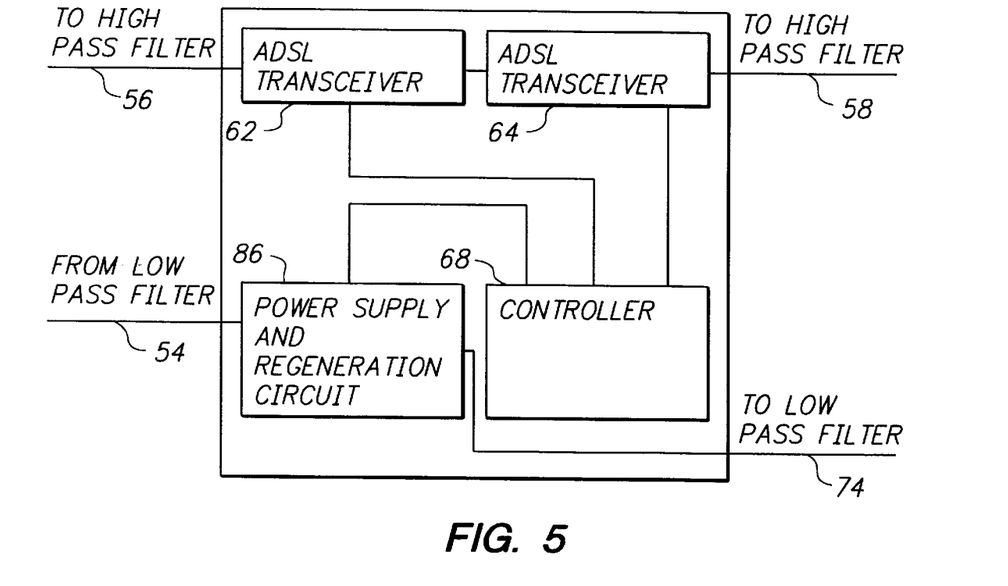
FIG. 5 illustrates a functional block diagram of an ADSL repeater of the alternative embodiment in FIG. 4.

FIG. 5 shows a functional block diagram of ADSL repeater 80, which, except for power supply and regeneration circuit 86, is similar to ADSL repeater 60 shown in FIG. 3. Therefore, detailed description of FIG. 5 is omitted.

The systems in FIGS. 2 and 4 each are shown for ADSL combined with a 2:1 pair gain system, i.e., 2 lines multiplexed over one pair. For example, one can use a Miniplex® 2N1 pair gain system commercially available from Raychem Corporation, Menlo Park, Calif. It is also possible to use a pair gain system with more than 2:1, e.g., a 4:1 pair gain system—4 lines multiplexed over one pair, such as a Miniplex® 4N1 pair gain system, which is also commercially available from Raychem Corporation. A 4:1 pair gain system uses more bandwidth, but the same principles apply. For an ADSL over a 4:1 pair gain system, the bit rate may be about 20% lower than for the full-rate of an ADSL over POTS. This is not so critical when the ADSL repeater unit of the present invention is used. If the full rate can achieve 6 Mbps over a loop length of 10,000 ft, then an ADSL over 4:1 pair gain system should be able to reach a speed of 5 Mbps. With the aid of an ADSL repeater unit of the present invention, a speed of 5 Mbps over a loop length of 20,000 ft can be achieved.

The power calculations for the pair gain system in FIG. 2 are now described. The known and unknown values in the calculations are listed below:

The known values are:

Prt: power consumption of the Miniplex® RT,

Prep: power consumption of the ADSL repeater,

Rf: resistance of the feeder part of the loop,

Rd: resistance of the distribution part of the loop, and

Vlc: powering voltage at the line card of the pair gain COT.

The unknown values are:

Vrt: voltage at the RT,

Irt: current drawn by the RT,

Vrep: voltage at the repeater,

Irep: current drawn by the repeater, and

Ilc: current to be delivered by the Miniplex® COT.

The following equations are used for power calculations for the pair gain system in FIG. 2.

$$Prt = Vrt * Irt \tag{1}$$

$$Vrep = Vrt + Rd * Irt \tag{2}$$

$$Prep = Vrep * Irep \tag{3}$$

$$Vlc = Vrep + Rf * Ilc \tag{4}$$

$$Ilc = Irep + Irt \tag{5}$$

From (1) and (3):

$$Irt = Prt / Vrt \tag{6}$$

$$Irep = Prep / Vrep \tag{7}$$

By substituting equations (6) and (7) in equations (2) an (3), the following are derived:

$$Vrt = Vrep - Rd*(Prt/Vrt) \quad (8)$$

$$Vrep = Vlc - Rf*((Prep/Vrep) + (Prt/Vrt)) \quad (9)$$

It is easy to solve (8) and (9) together iteratively by using, e.g., a spreadsheet, such as Microsoft Excel®.

The following examples illustrate the power calculations for two different systems: ADSL over 2:1 pair gain system and ADSL over 4:1 pair gain system. In the calculations of the these examples, it is assumed that Miniplex® 2N1 and Miniplex® 4N1 pair gain systems are used. Furthermore, the following assumptions are made:

power consumption of an ADSL repeater unit=6 W, power consumption of Miniplex® 2N1 RT=4 W, power consumption of Miniplex® 4N1 RT=6 W.

Also, all the powering voltages and currents remain within the GR-1089 A3 limits, as provided by Bellcore, "Electromagnetic Compatibility and Electrical Safety—Generic Criteria for Network Telecommunications Equipment," Issue 2, December 1997. The results of the calculations are shown in Table 1.

TABLE 1

Comparison of various parameters in power calculations for different systems

|  | ADSL over Miniplex® 2N1 pair gain system with ADSL repeater unit | ADSL over Miniplex® 4N1 pair gain system with ADSL repeater unit |
|---|---|---|
| Prep | 6 W | 6 W |
| Prt | 4 W | 6 W |
| Rf | 800 Ohm (resistance for a length of ± 10 kft) | 800 Ohm (resistance for a length of ± 10 kft) |
| Rd | 600 Ohm | 400 Ohm |
| Vlc | 200 V | 250 V |
| Vrep | 138 V | 200 V |
| Vrt | 118 V | 188 V |
| Irt | 34.0 mA | 32 mA |
| Irep | 43.4 mA | 30 mA |
| Ilc | 77.4 mA | 62 mA |

The power calculations for the pair gain system in FIG. 4 are next described.

The known values are:

Prt: power consumption of the Miniplex® RT,

Prep: power consumption of the ADSL repeater,

Rf: resistance of the feeder part of the loop,

Rd: resistance of the distribution part of the loop, and

Vlc: powering voltage at the line card of the pair gain COT.

Vrepout powering voltage at the output of the repeater

Eff_rep efficiency of the voltage boosting circuit in the repeater

The unknown values are:

Vrt: voltage at the RT,

Irt: current drawn by the RT,

Prepout power delivered from the repeater to the Miniplex® RT

Vrep: input voltage at the repeater,

Ilc: current to be delivered by the Miniplex COT.

The following equations are used for power calculations for the pair gain system in FIG. 4.

$$Prt = Vrt * Irt \quad (10)$$

$$Vrepout = Vrt + Rd * Irt \quad (11)$$

$$Prepout = Vrepout * Irt \quad (12)$$

$$Prep + (Prepout/Eff\_rep) = Vrep * Ilc \quad (13)$$

$$Vlc = Vrep + Rf * Ilc \quad (14)$$

From (10) and (11):

$$Irt = Prt/(Vrepout - Rd * Irt) \quad (15)$$

This can be readily solved for Irt. Substituting the value of Irt in (12) provides the value for Prepout.

Combining (13) and (14) gives:

$$Ilc*(Vlc - Rf*Ilc) = Prep + (Prepout/Eff\_rep) \quad (16)$$

This can be readily solved for Ilc. Substituting the value of Ilc in (13) or (14) allows one to calculate the value of Vrep.

The following examples illustrate the power calculations for two different systems: ADSL over 2:1 pair gain system and ADSL over 4:1 pair gain system. In the calculations of the these examples, it is assumed that Miniplex® 2N1 and Miniplex® 4N1 pair gain systems are used. Furthermore, the following assumptions are made:

power consumption of an ADSL repeater unit=6 W, power consumption of Miniplex® 2N1 RT=4 W, power consumption of Miniplex® 4N1 RT=6 W.

Also, all the powering voltages and currents remain within the GR-1089 A3 limits, as provided by Bellcore, "Electromagnetic Compatibility and Electrical Safety—Generic Criteria for Network Telecommunications Equipment," Issue 2, December 1997. The results of the calculations are shown in Table 2.

TABLE 2

Comparison of various parameters in power calculations for different systems

|  | ADSL over Miniplex® 2N1 pair gain system with ADSL repeater unit | ADSL over Miniplex® 4N1 pair gain system with ADSL repeater unit |
|---|---|---|
| Prep | 6 W | 6 W |
| Prt | 4 W | 6 W |
| Rf | 800 Ohm (resistance for a length of ± 10 kft) | 800 Ohm (resistance for a length of ± 10 kft) |
| Rd | 600 Ohm | 400 Ohm |
| Vlc | 200 V | 250 V |
| Vrepout | 200 V | 250 V |
| Eff_rep | 0.80 | 0.80 |
| Vrep | 142 V | 201 V |
| Vrt | 187 V | 240 V |
| Irt | 21.4 mA | 25.0 mA |
| Ilc | 72.3 mA | 60.8 mA |

While the invention has been described in conjunction with several specific embodiments, it is evident to those skilled in the art that many further alternatives, modifications and variations will be apparent in light of the foregoing description. For example, the invention could also be used in VDSL (Very-high-bit rate DSL) applications. Thus, the invention described herein is intended to embrace all such alternatives, modifications, applications and variations as may fall within the spirit and scope of the appended claims.

What is claimed is:

1. A telecommunications system including a twisted wire pair extending from a central office location to a subscriber premises location, the system comprising:

a digital subscriber line (DSL) transmission/receiving system connected to the twisted wire pair and having a pair gain central office terminal (COT) located at the central office location, that converts a first plurality of analog telecommunications signals into a DSL signal and supplies the DSL signal and operating power over the twisted wire pair and having a pair gain remote terminal (RT) at the subscriber premises location that obtains the DSL signal and operating power from the twisted wire pair and converts the DSL signal into the first plurality of analog telecommunications signals;

an asymmetrical digital subscriber line (ADSL) transmission/receiving system connected to the twisted wire pair and having an ADSL access multiplexer located at the central office location, that bidirectionally translates central office broadband data into central office ADSL signals and subscriber ADSL signals into subscriber broadband data, and having an ADSL modem at the subscriber premises location that bidirectionally translates subscriber broadband data into subscriber ADSL signals and central office ADSL signals into central office broadband data; and an ADSL repeater unit, coupled to the twisted wire pair, for selectively receiving and bidirectionally repeating the ADSL signals via the twisted wire pair, said ADSL repeater unit also receiving operating power from the DSL COT via the twisted wire pair;

wherein said ADSL repeater unit extends the useful length of the twisted wire pair for carrying the ADSL signals.

2. The telecommunications system set forth in claim 1 wherein the ADSL repeater unit includes a repeater power supply connected to the twisted wire pair for regenerating COT supplied operating power to a predetermined higher voltage value and for supplying the regenerated operating power over the twisted wire pair to operate the DSL RT.

3. The system of claim 1 wherein:

said central office location further includes a first splitter that receives a DSL signal from the COT and an ADSL signal from the ADSL access multiplexer, and provides a combined DSL signal to said customer premises location, and an ADSL signal to said ADSL repeater unit, via the twisted wire pair; and the first splitter also receives combined a DSL signal and a repeated ADSL signal via the twisted wire pair, separates the DSL signal from the repeated ADSL signal, provides the DSL signal to the COT, and provides the repeated ADSL signal to the ADSL access multiplexer.

4. The system of claim 3 wherein:

said customer premise system further includes a second splitter that receives combined a DSL signal, and a repeated ADSL signal from said repeater unit, via the twisted wire pair, separates the DSL signal from the repeated ADSL signal, provides the DSL signal to the RT, and provides the repeated ADSL signal to the ADSL modem; and the second splitter also receives a DSL signal from the RT and an ADSL signal from the ADSL modem and provides a combined DSL signal to the COT and an ADSL signal to said repeater unit via the twisted wire pair.

5. The system of claim 1 wherein the twisted wire pair comprises a first segment between said central office location and said ADSL repeater, and a second segment between said ADSL repeater and said subscriber premises location, and said ADSL repeater unit comprises:

a power supply circuit for drawing repeater operating power from the COT via the first segment, a first low pass filter, coupled between the first and second segments, for allowing only DSL type signals and DC power signals to pass through;

a second low pass filter, coupled between the first segment and the ADSL repeater unit, for allowing only the DC power signal to pass through to the repeater power supply;

a first high pass filter, coupled between the first segment and the ADSL repeater, for allowing only the ADSL signal to pass through; and a second high pass filter, coupled between the ADSL repeater and the second segment, for allowing only the ADSL signal to pass through.

6. The system of claim 5 wherein the ADSL repeater receives a downstream ADSL signal from said central office location and remodulates it to provide a corresponding repeated ADSL signal to said customer premises location, the ADSL repeater also receiving an upstream ADSL type signal from the customer premises location and remodulating it to provide a corresponding repeated ADSL type signal to said central office location.

7. The system of claim 5 wherein:

the first low pass filter has a cutoff frequency of approximately 100 kHz;

the second low pass filter has a cutoff frequency of approximately 100 Hz; and the first and second high pass filters each have a cutoff frequency of approximately 100 kHz.

8. The system of claim 1 wherein the twisted wire pair comprises a first segment between said central office location and said ADSL repeater, and a second segment between said ADSL repeater and said subscriber premises location, and the ADSL repeater unit comprises:

a power supply and regeneration circuit that regenerates DC signals to predetermined higher values, a band pass filter, coupled between the first and second segments, for allowing only a DSL signal to pass through;

a first low pass filter, coupled between the first segment and the ADSL repeater, for allowing only DC power to pass through to the repeater power supply and regeneration circuit;

a second low pass filter, coupled between the repeater power supply and the second segment for allowing only a regenerated DC power signal to pass through;

a first high pass filter, coupled between the first segment and the ADSL repeater, for allowing only the ADSL signal to pass through; and a second high pass filter, coupled between the ADSL repeater and the second segment, for allowing only the ADSL signal to pass through.

9. The system of claim 8 wherein the ADSL repeater receives a downstream ADSL signal from said central office system and remodulates it to provide a corresponding repeated ADSL signal to said customer premises location, the ADSL repeater also receiving an upstream ADSL signal from the customer premises location and remodulating it to provide a corresponding repeated ADSL signal to said central office location.

10. The system of claim 8 wherein:

the band pass filter has a frequency band between approximately 100 Hz to 100 kHz;

the first and second low pass filter each have a cutoff frequency of approximately 100 Hz; and the first and second high pass filters each have a cutoff frequency of 100 kHz.

11. A method for extending bandwidth and useful service distance of a twisted wire pair telecommunications service loop between a central office location and a subscriber premises location, comprising the steps of:

(a) providing and receiving digital subscriber line (DSL) signals and providing DSL remote terminal operating power with a DSL central office terminal (COT) at the central office location; and providing and receiving DSL signals and drawing operating power with a DSL remote terminal (RT) at the subscriber premises location, using the twisted wire pair;

(b) providing and receiving asymmetric DSL (ADSL) signals with a central office ADSL transmission/receiving unit at the central office location; and providing and receiving ADSL signals at an ADSL remote unit at the subscriber premises location, using the twisted wire pair;

(c) providing repeated ADSL signals within the telecommunications service loop with an ADSL repeater unit connected to the twisted wire pair at a location intermediately between the central office location and subscriber premises location; and (d) providing operating power to the ADSL repeater unit from the DSL COT via the twisted wire pair.

12. The method of claim 11 wherein step (c) includes further steps of:

providing a power supply circuit within the ADSL repeater unit, receiving an ADSL signal and providing a corresponding repeated ADSL with the ADSL repeater unit;

passing only DSL signals and operating power through a first low pass filter within the ADSL repeater unit, coupled to the twisted wire pair;

passing only operating power through a second low pass filter, coupled between the twisted wire pair and the repeater power supply circuit;

passing only ADSL signals through a first high pass filter, coupled between the twisted wire pair and the ADSL repeater unit; and passing only ADSL signals through a second high pass filter coupled between the ADSL repeater and the twisted wire pair.

13. The method of claim 12 wherein step (c) includes:

receiving and remodulating a downstream ADSL signal from the central office ADSL transmitting/receiving unit to provide a corresponding repeated ADSL signal to the ADSL remote unit at the subscriber premises location, using the ADSL repeater and the twisted wire pair, and receiving and remodulating an upstream ADSL signal from the ADSL remote unit at the subscriber premises location to provide a corresponding repeated ADSL type signal to the central office ADSL transmitting/receiving unit, using the ADSL repeater and the twisted wire pair.

14. The method of claim 12 wherein:

the first low pass filter has a cutoff frequency of 100 kHz;

the second low pass filter has a cutoff frequency of 100 Hz; and the first and second high pass filters each have a cutoff frequency of 100 kHz.

15. The method of claim 11 wherein step (c) includes steps of:

providing a power supply and regeneration circuit that regenerates COT supplied operating power to predetermined higher voltage values;

receiving an ADSL signal and providing a corresponding repeated ADSL signal;

passing only DSL type signals through a band pass filter coupled to the twisted wire pair;

passing only operating power through a first low pass filter, coupled between the twisted wire pair and the ADSL repeater unit power supply such that only operating power passes through to the power supply and regeneration circuit of the ADSL repeater;

passing only regenerated operating power through a second low pass filter coupled between the repeater power supply and the twisted wire pair;

passing only ADSL signals through a first high pass filter coupled between a first segment of the twisted wire pair leading to the central office ADSL unit and the ADSL repeater unit; and passing only ADSL signals through a second high pass filter coupled between the ADSL repeater unit and a second segment of the twisted wire pair leading to the subscriber premises ADSL unit.

16. The method of claim 15 wherein step (c) includes steps of:

receiving and remodulating a downstream ADSL signal from the central office ADSL transmission/receiving unit to provide a corresponding repeated ADSL signal to the ADSL remote unit at the subscriber premises location using the ADSL repeater and the second segment; and, receiving and remodulating an upstream ADSL signal from the ADSL remote unit at the subscriber premises location and remodulating it to provide a corresponding repeated ADSL signal to the central office ADSL transmission/receiving unit, using the ADSL repeater unit and the first segment.

17. The method of claim 15 wherein:

the band pass filter has a frequency band between approximately 100 Hz to 100 kHz;

the first and second low pass filter each have a cutoff frequency of approximately 100 Hz; and the first and second high pass filters each have a cutoff frequency of 100 kHz.

18. The method of claim 11 comprising the further step of regenerating COT supplied operating power to a predetermined higher voltage value with a power supply of the ADSL repeater unit and supplying regenerated operating power over the twisted wire pair to operate the DSL RT.

19. An asynchronous digital subscriber line (ASDL) service repeater unit for extending bandwidth and useful service distance of a twisted wire pair telecommunications service loop extending from a central office location to a subscriber premises location, the central office location including a first telecommunications system comprising a pair gain digital subscriber line (DSL) central office terminal (COT) for supplying DSL signals and operating power over the service loop and a DSL remote terminal (RT) connected to receive DSL signals and operating power at the subscriber premises location, and a second telecommunications system comprising a central office asynchronous DSL (ADSL) unit at the central office location for supplying ASDL signals over the service loop and a subscriber premises ADSL unit at the subscriber premises location for receiving ADSL signals via the service loop; the ADSL service repeater unit being connected to the service loop intermediately of the central office location and the subscriber premises location and including:

signal filtering means for passing the DSL signals without modification, and for separating the operating power and the ADSL signals, a pair of ADSL transceivers for respectively repeating ADSL signals from the central office ADSL unit to the subscriber premises ADSL unit and from the subscriber premises ADSL unit to the central office ADSL unit, and a repeater power supply for providing operating power for operating the pair of ADSL transceivers, and for regenerating the operating power to a predetermined higher voltage level and sending the regenerated operating power over the service loop to provide regenerated operating power for operating the DSL RT.

20. The ADSL service repeater unit set forth in claim 19 further comprising a repeater controller connected to control the pair of ADSL transceivers.

\* \* \* \* \*